April 3, 1951          A. P. KRUEGER          2,547,583
TAPE DISPENSING MECHANISM
Filed Jan. 19, 1949          2 Sheets-Sheet 1
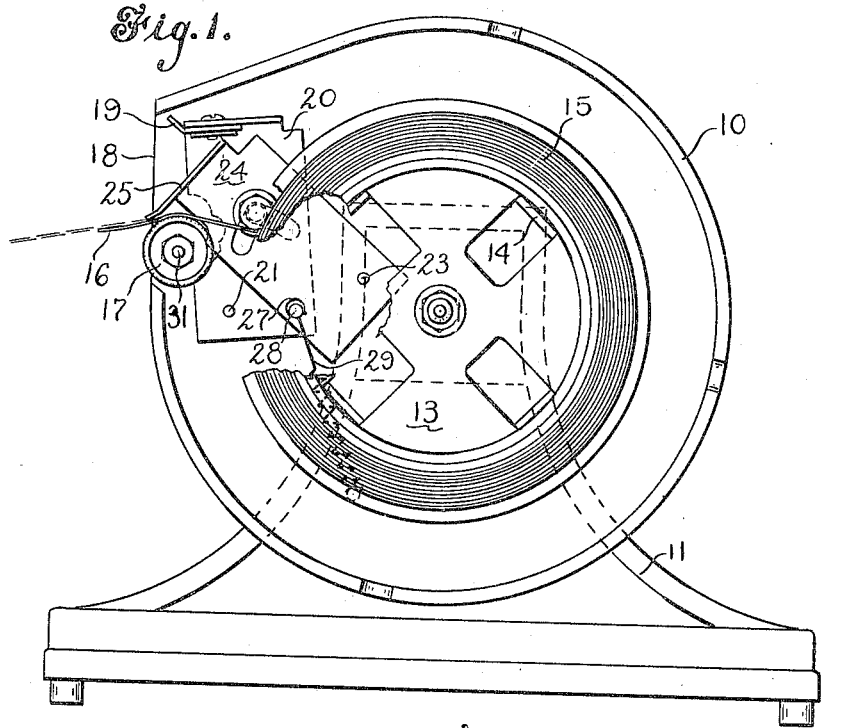
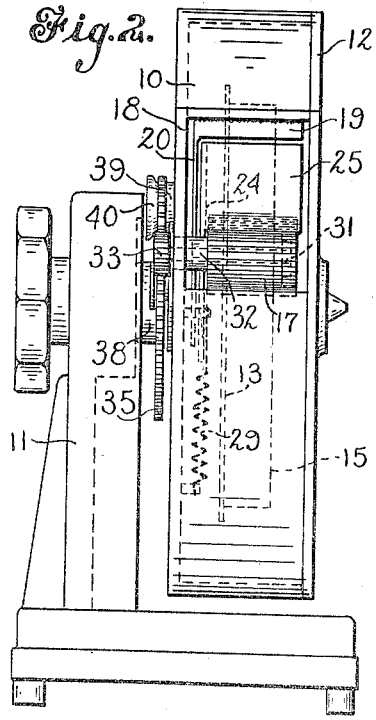
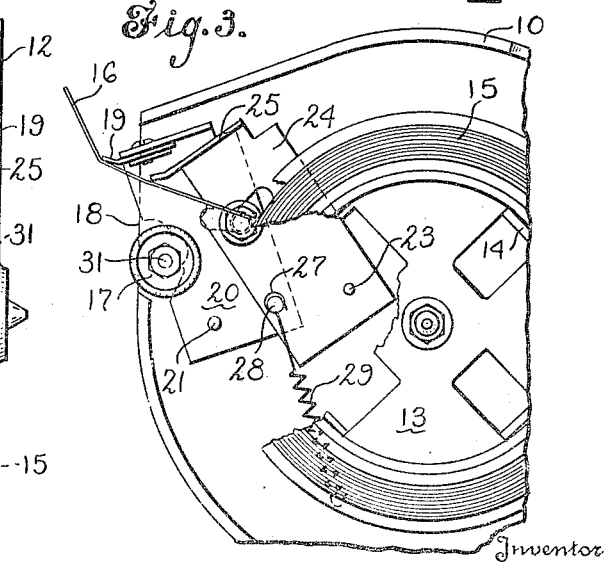
Inventor
Alfred R. Krueger
By
Burkhardt & Bartholow
ATTORNEYS April 3, 1951 A. P. KRUEGER 2,547,583
TAPE DISPENSING MECHANISM
Filed Jan. 19, 1949 2 Sheets-Sheet 2

Inventor
Alfred P. Krueger
By
ATTORNEYS

Patented Apr. 3, 1951

2,547,583

UNITED STATES PATENT OFFICE 2,547,583

TAPE DISPENSING MECHANISM

Alfred P. Krueger, Stratford, Conn., assignor to Derby Sealers, Incorporated, Derby, Conn., a corporation of Connecticut Application January 19, 1949, Serial No. 71,573

10 Claims. (Cl. 164—84.5)

This invention relates to tape-dispensing machines and, more particularly, to a device for dispensing pressure-sensitive tape which is tacky or clingable upon one surface.

In using pressure-sensitive tape, it is often desirable to be able to draw the tape from the supply roll in measured lengths, as certain uses of such tape require predetermined lengths of strip so that sufficient tape will be had to meet the requirements, and no more. It is, therefore, desirable to employ a tape-dispensing device which will deliver predetermined lengths of tape, which lengths will be measured with reasonable accuracy so as to be uniform.

Moreover, as the uses of this character of tape vary, the desired length of the tape strip will also vary and, in providing a machine which will deliver a measured length of strip, it is also desirable, in order that the device be capable of universal use, that it also be capable of adjustment so that, within limits, any desired length of strip may be secured.

Owing to the tacky or clingable characteristic of one surface of the tape, the provision of a practical and commercial device for dispensing it has presented a considerable problem. In the present instance, the dispenser may be termed one of the "pull" type in that the tape is drawn from the supply roll by a pull upon its free end. The tape is drawn over what may be termed a feed roll, and the tacky nature of the tape is, in this instance, employed to rotate the roll so that the measurement of the dispensed strip can be effected by limiting the rotation of this roll with which the tacky side of the tape is engaged.

As the limitation of the movement of the feed roll in a forward or tape-feeding direction is effected by means of a stop, provision is made for the reverse rotation of the roll, in order to position the measuring means for a subsequent operation. In the present instance, the feed roll is permitted to rotate in a reverse direction between feeding operations, and it will be apparent that such reverse rotation must be effected when the tape is disengaged from the roll for, if the tape engaged the roll during its reverse rotation, it would, of course, be carried in a reverse direction and a free end of the tape would then not be accessible to be grasped by the operator. To this end, a severing mechanism is provided in a position which is spaced from the feed roll so that the tape must be drawn away from the roll to be drawn against the severing blade. The severing operation, therefore, requires that the tape be drawn away from the roll and, immediately upon the disengagement of the tape from the roll, the latter is rotated in a reverse direction to an initial or starting position. Means are provided to thereafter strip the unsevered end of the tape from the severing member and cause it to impinge again against the roll, in order that a free end will project from the machine to be grasped by the operator. It will be understood, however, that this reengagement of the tape with the feed roll takes place after the reverse rotation of the latter, so that this reverse rotation takes place between the time that the tape is drawn from the roll and the time at which it is returned to the roll after the dispensed strip is severed.

One object of the present invention is to provide a new and improved device for dispensing pressure-sensitive tape.

A further object of the invention is to provide a mechanism for dispensing pressure-sensitive tape, such that predetermined and accurately measured strips of tape may be drawn from the supply roll.

Still another object of the invention is to provide a mechanism for dispensing measured lengths of pressure-sensitive tape, the tape being drawn from the supply roll over a feed roller, the surface of which is engaged by the tacky side of the tape, and the dispensed strips measured by the rotation of this feed roller by the adherence of the strip of tape thereto.

Still another object of the invention is to provide a mechanism for delivering measured strips of pressure-sensitive tape, such that any desired length of strip, within limits, may be obtained.

To these and other ends the invention consists in the novel features and combinations of parts to be hereinafter described and claimed.

In the accompanying drawings:

Fig. 1 is a side elevational view of a tape-dispensing mechanism embodying my invention, the cover of the case or housing being removed to show the interior mechanism;

Fig. 2 is a front elevational view thereof;

Fig. 3 is a view similar to Fig. 1 showing the position of the parts during the severing operation;

Figure 4:
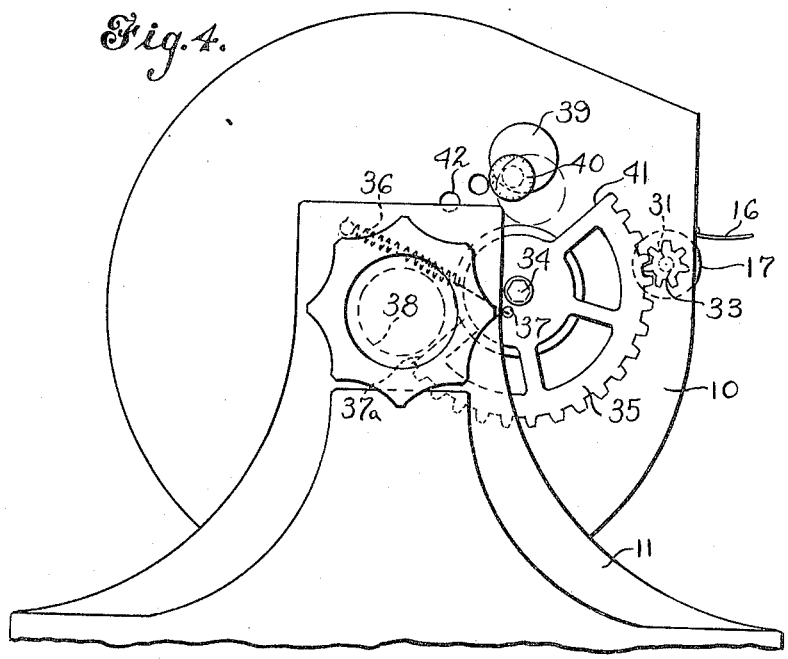
Fig. 4 is a side elevational view of the device at the side opposite that shown in Fig. 1.

To illustrate a preferred embodiment of my invention, I have shown a tape-dispensing mechanism comprising a casing or housing 10 mounted on a standard 11, the casing being closed by a cover 12.

Within the casing is rotatably mounted a roll holder or reel 13 having laterally projecting arms 14 upon which may be mounted the supply roll of tape 15. The free end of the tape is shown at 16 as it comes from the roll, and the lower or tacky side of this end of the tape is in engagement with a knurled roller 17 so that the tape will cling to the surface of the roller and effect its rotation as the tape is drawn thereover.

This roller is positioned adjacent the lower portion of an opening 18 in the case and also adjacent this opening is mounted a severing member 19. The latter is supported on a plate 20 pivoted to the case at 21 so that it will swing from the position shown in Fig. 1, in which it is housed within the case, to the exposed position shown in Fig. 3, where it may be readily engaged by the tape for the severing operation.

Also pivotally mounted in the case at 23 is a plate 24 which carries a stripper blade 25, the forward free edge of which extends across the tape, as shown in Fig. 3, and across the surface of the feed roll 17. This free end of the stripper will preferably lie closely adjacent the surface of the roller 17, although not necessarily in engagement with this surface, or in engagement with the upper surface of the tape 16 when the latter adheres to the roller. The plate 24 is provided with an opening 27 which loosely receives a pin 28 secured to the plate 20, so that movement of one of these plates about its pivot will also effect movement of the other. The two plates are maintained in their position of rest shown in Fig. 1 by a spring 29 secured at one end to the pin 28, and secured at its other end to the casing or housing.

In operation, the user grasps the free end 16 of the tape with his fingers and draws it forwardly over the feed roller 17 effecting rotation of this roll. At the end of the feeding operation, the tape is drawn away from the roll 17 (in an upward direction as illustrated) toward the severing member 19. The engagement of the tape with the free edge of the stripper 25, as the tape is drawn away from the feed roll, causes the stripper member to be moved about the pivot 23, thus also causing the severing member 19 to be moved forwardly about its pivot 21, so that the severing member projects from the casing. This position of the parts is shown in Fig. 3 where, as will be seen, the tape may be readily engaged by the severing member and the dispensed strip torn off. As soon as tension upon the tape is released by the severing of the dispensed strip, the spring 29 will return the plates 20 and 24 from the position shown in Fig. 3 to that shown in Fig. 1, the severing member will be returned to its retracted position within the case, and the stripper 25, by contacting the upper surface of the tape, will move the latter downwardly, causing it to impinge upon, and be engaged with, the feed roll 17 for a subsequent operation. It will also be seen from Fig. 3 that the stripper member 25 engages the tape at an appropriate distance rearwardly of the edge of the severing member so that, as shown in Fig. 1, a sufficient length will project from the stripper and feed roll to be grasped by the user.

The mechanism for determining the length of the dispensed strip will now be described.

The roller 17 is secured to a shaft 31 which is rotatably mounted in a sleeve bearing 32 secured to the wall of the casing 10. The shaft 31 extends through this wall, and secured to the extended end of the shaft is a pinion 33 (Figs. 2 and 4), so that this pinion rotates with the feed roll 17. Rotatably mounted at 34 on the wall of the casing 10 is a sector gear 35, the teeth of which are in engagement with the teeth of the pinion 33. A spring 36 is secured at one end to the casing 10 and its other end is secured at 37 to the gear 35, the point 37 being eccentric with respect to the axis of the gear so that the spring normally holds the gear in the position shown in Fig. 4, wherein the edge 37$^a$ of the gear is engaged with a boss 38 on the casing, the latter acting as a stop to limit rotation of the gear in this direction. This position of the parts is shown in Fig. 4, and is the rest position corresponding to that shown in Fig. 1.

An adjustable stop 39, which in this instance comprises a circular disk, is mounted on the case by a screw 40, the screw being eccentric with respect to the center of the disk 39, so that, when the screw is loosened, the disk 39 may be rotated about the screw, thus positioning the periphery of the disk at various distances from the edge 41 of the sector gear 35 when the latter is in the position shown in Fig. 4. That is, the disk 39 may be set, for example, in the dotted-line position shown in this figure, thus allowing a very limited movement to the gear 35; or it may be set in any other position about the axis of the screw 40, such as the position shown in full lines, allowing a greater range of movement to the gear 35. In order that a still greater range of movement may be allowed the gear in order to dispense still longer strips of tape, a number of openings 42 may be provided in the casing for the screw 40, thus mounting the disk stop 39 at greater distances from the edge 41 of the gear.

Figure 5:
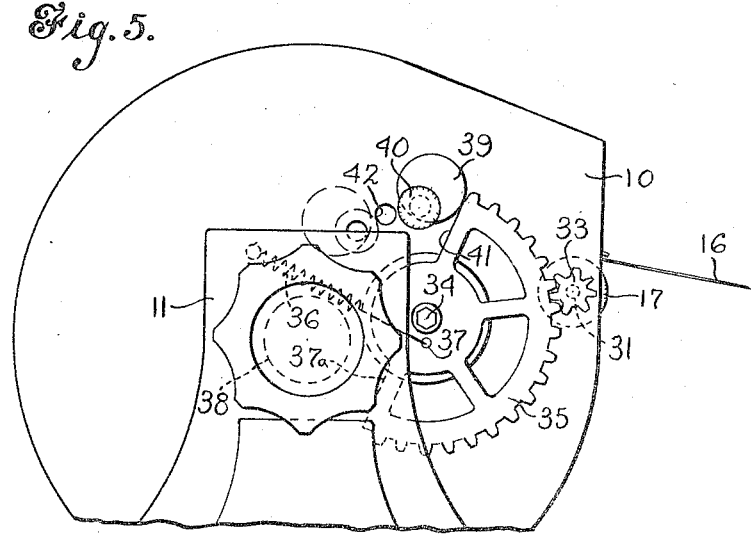
Fig. 5 is a view similar to Fig. 4 showing the parts in another position.

The manner of drawing tape from the supply roll and severing the tape has already been explained, and it has also been explained that, as the tape is drawn from the roll in engagement with the periphery of the feed roll 17, this roll will be caused to rotate. At the beginning of the tape-dispensing operation, the parts are in the position shown in Figs. 1 and 4, and it will be noted that the edge 37$^a$ of the gear 35 is in engagement with the boss 38 on the case. As the feed roll rotates, the pinion 33, which rotates with the roll, will effect rotation of the gear 35 until the edge 41 of this gear engages the periphery of the stop 39. This will stop the operation of the device, as the feed roll 17 will no longer be permitted to turn and the operator will be aware by the pull upon the tape that the predetermined length has been drawn from the roll. He then moves the free end of the tape from the position shown in Fig. 1 to that shown in Fig. 3, and, it will be noted that, the lower surface of the tape has been freed from engagement with the roll 17. Immediately upon disengagement of the tape from the feed roll, the latter will be free to rotate in a reverse direction, and this reverse rotation will be effected by the spring 36 acting upon the gear 35 which will move the gear from the position shown in Fig. 5 to that shown in Fig. 4, wherein the edge 37$^a$ engages the boss 38. This will effect reverse rotation of the feed roll 17 through the pinion 33, and this reverse rotation will be accomplished when the tape is in the position shown in Fig. 3.

Thereafter the tape will be severed against the edge of the severing member 19 and the unsevered portion will be returned by the stripper 25 against the feed roll 17 and be engaged again with the surface of this roll for a subsequent operation.

It will be obvious that I have provided a very simple means for delivering measured strips of tape, and that I have made use of the tacky nature of the tape to effect the measuring operation, while, at the same time, have made it necessary to disengage the tape from the feed roll for the severing operation, and thus have provided the opportunity for the feed roll to be returned to its initial position while the tape is disengaged therefrom.

While I have shown and described a preferred embodiment of my invention, it will be understood that it is not to be limited to all of the details shown, but is capable of modification and variation within the spirit of the invention and within the scope of the claims.

What I claim is:

1. A machine for dispensing pressure-sensitive tape comprising a frame, means thereon for supporting a supply roll of tape, a roller rotatably mounted in the frame to which the tacky side of the tape adheres as it comes from the supply roll, said roller being rotated in a forward direction when the tape is drawn thereover, a severing member spaced from the roller on the non-tacky side of the tape whereby the tape must be disengaged from the roller when moved against the severing member, measuring means connected to the roller, and means for rotating said roller in a reverse direction when the tape is moved toward the severing member.

2. A machine for dispensing pressure-sensitive tape comprising a frame, means thereon for supporting a supply roll of tape, a roller rotatably mounted in the frame to which the tacky side of the tape adheres as it comes from the supply roll, said roller being rotated in a forward direction when the tape is drawn thereover, a severing member spaced from the roller on the non-tacky side of the tape whereby the tape must be disengaged from the roller when moved against the severing member, measuring means connected to the roller, and spring means rotating said roller in a reverse direction when the tape is disengaged therefrom.

3. A device for dispensing measured lengths of pressure-sensitive tape, said device comprising means for supporting a supply roll of tape, a rotatably mounted measuring member to which the tacky side of the tape adheres as it is drawn from the supply roll by a pull upon the free end of the tape whereby said member is rotated in a forward direction, a severing member spaced from said measuring member on the non-tacky side of the tape whereby the tape must be disengaged from the feed member when drawn against the severing member, spring means rotating said measuring member in a reverse direction when the tape is disengaged therefrom, and a stop limiting the reverse rotation of the measuring member.

4. A device for dispensing measured lengths of pressure-sensitive tape, said device comprising means for supporting a supply roll of tape, a rotatably mounted measuring member to which the tacky side of the tape adheres as it is drawn from the supply roll by a pull upon the free end of the tape whereby said member is rotated in a forward direction, a severing member spaced from said measuring member on the non-tacky side of the tape whereby the tape must be disengaged from the measuring member when drawn against the severing member, spring means rotating said measuring member in a reverse direction when the tape is disengaged therefrom, a stop limiting the reverse rotation of the measuring member, and a second stop limiting the forward movement of said member.

5. A device for dispensing measured lengths of pressure-sensitive tape, said device comprising means for supporting a supply roll of tape, a rotatably mounted measuring member to which the tacky side of the tape adheres as it is drawn from the supply roll by a pull upon the free end of the tape whereby said member is rotated in a forward direction, a severing member spaced from said measuring member on the non-tacky side of the tape whereby the tape must be disengaged from the measuring member when drawn against the severing member, spring means rotating said measuring member in a reverse direction when the tape is disengaged therefrom, a stop limiting the reverse rotation of the measuring member, and a second stop limiting the forward movement of said member, one of said stops being adjustable to vary the length of the strip of tape dispensed.

6. A machine for dispensing pressure-sensitive tape comprising a frame, means thereon for supporting a supply roll of tape, severing means mounted in a position spaced from the path of the tape on the non-tacky side thereof against which the tape may be drawn to be severed, a roller rotatably mounted on the frame with which the tacky side of the tape is engaged as it comes from the supply roll to rotate the roller in a forward direction, spring means tending to rotate said roller in a reverse direction, and measuring means connected wtih said roller to limit the forward rotation thereof.

7. A machine for dispensing pressure-sensitive tape comprising a frame, means thereon for supporting a supply roll of tape, severing means mounted in a position spaced from the path of the tape on the non-tacky side thereof against which the tape may be drawn to be severed, a roller rotatably mounted on the frame with which the tacky side of the tape is engaged as it comes from the supply roll to rotate the roller in a forward direction, spring means tending to rotate said roller in a reverse direction, measuring means connected with said roller to limit the forward rotation thereof, and stripping means to return the unsevered end of the tape to said roller after a severing operation.

8. A machine for dispensing pressure-sensitive tape comprising a frame, means thereon for supporting a roll of tape, a severing member movably mounted on the frame, a roller rotatably mounted on the frame with which the tacky side of the tape is engaged as it comes from the roll, said severing member being spaced from the path of the tape on the non-tacky side thereof whereby the tape must be disengaged from the roller to be drawn against the severing member, stripping means movably mounted on the frame to be engaged by the non-tacky side of the tape and moved thereby when the tape is moved toward the severing member, said stripping means being connected to said severing member to move the latter toward the tape and serving to return the tape into engagement with said roller after a severing operation, means to limit forward and reverse rotation of said roller, and means tending to rotate said roller in a reverse direction when the tape is disengaged therefrom by movement toward the severing member.

9. A machine for dispensing pressure-sensitive tape comprising a frame, means thereon for supporting a roll of tape, a severing member movably mounted on the frame, a roller rotatably mounted on the frame with which the tacky side of the tape is engaged as it comes from the roll, said severing member being spaced from the path of the tape on the non-tacky side thereof whereby the tape must be disengaged from the roller to be drawn against the severing member, stripping means movably mounted on the frame to be engaged by the non-tacky side of the tape and moved thereby when the tape is moved toward the severing member, said stripping means being connected to said severing member to move the latter toward the tape and serving to return the tape into engagement with said roller after a severing operation, means to limit forward and reverse rotation of said roller, and means tending to rotate said roller in a reverse direction when the tape is disengaged therefrom by movement toward the severing member, one of said limiting means being adjustable whereby a predetermined length of tape may be dispensed.

10. A machine for dispensing pressure-sensitive tape comprising a frame, means thereon for supporting a roll of tape, a severing member movably mounted on the frame, a roller rotatably mounted on the frame with which the tacky side of the tape is engaged as it comes from the roll, said severing member being spaced from the path of the tape on the non-tacky side thereof whereby the tape must be disengaged from the roller to be drawn against the severing member, stripping means movably mounted on the frame to be engaged by the non-tacky side of the tape and moved thereby when the tape is moved toward the severing member, said stripping means being connected to said severing member to move the latter toward the tape and serving to return the tape into engagement with said roller after a severing operation, measuring means connected with said roller, said measuring means comprising a pinion secured to said roller, a gear rotatably mounted on the frame with which the teeth of said pinion are engaged, means for limiting forward and reverse rotation of said gear, and spring means tending to rotate said roller in a reverse direction when the tape is disengaged therefrom.

ALFRED P. KRUEGER.

REFERENCES CITED

The following references are of record in the file of this patent:

UNITED STATES PATENTS

| Number | Name | Date |
|---|---|---|
| Re. 16,774 | Uttz | Oct. 18, 1927 |
| 590,638 | Bechtel | Sept. 28, 1897 |
| 1,827,745 | Hagemann | Oct. 20, 1931 |
| 1,931,369 | Arnold et al. | Oct. 17, 1933 |
| 2,291,668 | Weigolt | Aug. 4, 1942 |
| 2,311,363 | Beuier | Feb. 16, 1943 |
| 2,352,445 | Pinckney | June 27, 1944 |
| 2,424,483 | Morin | July 22, 1947 |
| 2,507,395 | Boegner | May 9, 1950 |